US009376969B2

(12) United States Patent
Yang et al.

(10) Patent No.: US 9,376,969 B2
(45) Date of Patent: Jun. 28, 2016

(54) AIR INTAKE SYSTEM HYDROCARBON TRAP PURGING

(71) Applicant: Ford Global Technologies, LLC, Dearborn, MI (US)

(72) Inventors: Dennis Seung-Man Yang, Canton, MI (US); Aed M. Dudar, Canton, MI (US); Mark W. Peters, Wolverine Lake, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 13/874,204

(22) Filed: Apr. 30, 2013

(65) Prior Publication Data

US 2014/0318506 A1    Oct. 30, 2014

(51) Int. Cl.

| *F02M 25/08* | (2006.01) |
|---|---|
| *F02D 29/02* | (2006.01) |
| *F02D 41/04* | (2006.01) |
| *F02D 41/00* | (2006.01) |
| *F02D 13/02* | (2006.01) |
| *F02D 19/08* | (2006.01) |

(52) U.S. Cl.
CPC .............. *F02D 29/02* (2013.01); *F02D 41/004* (2013.01); *F02D 41/0032* (2013.01); *F02D 41/042* (2013.01); *F02M 25/0809* (2013.01); F02D 13/0219 (2013.01); F02D 19/084 (2013.01); F02D 2200/703 (2013.01); Y02T 10/36 (2013.01); Y10S 903/902 (2013.01)

(58) Field of Classification Search
CPC ............ F02D 19/0621; F02D 41/0032; F02D 41/0035; F02D 41/0037; F02D 41/004; F02D 41/0042; F02M 25/08; F02M 33/08

USPC ............. 123/516, 518, 519, 520, 521, 198 D, 123/698; 701/103, 112; 73/114.39
See application file for complete search history.

(56) References Cited

U.S. PATENT DOCUMENTS

| 3,448,731 | A | * | 6/1969 | Daigh ............................ 123/519 |
|---|---|---|---|---|
| 5,398,660 | A | * | 3/1995 | Koyama et al. ................ 123/519 |
| 6,024,060 | A | * | 2/2000 | Buehrle, II ................ F01L 9/02 123/90.11 |
| 6,374,811 | B1 | * | 4/2002 | Mancini ........................ 123/519 |
| 6,401,528 | B1 | * | 6/2002 | Lambert ............ F02M 25/0809 73/114.39 |

(Continued)

FOREIGN PATENT DOCUMENTS

KR    1020120032759 A    4/2012

OTHER PUBLICATIONS

Anonymous, "An AIS Active Purge Method for PHEV Vehicles", IPCOM No. IPCOM000238747D, Published Sep. 16, 2014.*

(Continued)

*Primary Examiner* — Stephen K Cronin
*Assistant Examiner* — Kevin R Steckbauer
(74) *Attorney, Agent, or Firm* — James Dottavio; Alleman Hall McCoy Russell & Tuttle LLP (57) ABSTRACT

Methods and systems for passively purging a hydrocarbon trap in an engine intake in a vehicle are disclosed. In one example approach, a method comprises, in response to an ambient temperature decrease during an engine off condition while a fuel tank is sealed from atmosphere, delivering fuel stored in a hydrocarbon trap in an intake of the engine to a fuel vapor canister coupled to the fuel tank in an emission control system.

18 Claims, 5 Drawing Sheets

(56) References Cited

U.S. PATENT DOCUMENTS

| | | | | |
|---|---|---|---|---|
| 6,581,580 B2 * | 6/2003 | Trumpy et al. | | 123/519 |
| 6,874,484 B2 * | 4/2005 | Benjey | | B60K 15/03519 |
| | | | | 123/520 |
| 6,959,696 B2 * | 11/2005 | Shears et al. | | 123/516 |
| 7,107,759 B2 * | 9/2006 | Annoura et al. | | 60/283 |
| 7,435,289 B2 * | 10/2008 | Shears | | F02M 25/0854 |
| | | | | 123/519 |
| 7,666,507 B2 * | 2/2010 | Ishikawa | | B01J 20/20 |
| | | | | 428/408 |
| 7,913,672 B2 | 3/2011 | Elwart et al. | | |
| 8,074,627 B2 * | 12/2011 | Siddiqui | | F02M 25/0818 |
| | | | | 123/516 |
| 8,096,438 B2 * | 1/2012 | Schmalz et al. | | 220/371 |
| 8,181,631 B2 * | 5/2012 | Bohr | | F02M 25/0854 |
| | | | | 123/520 |
| 8,215,290 B2 * | 7/2012 | Dunkle et al. | | 123/516 |
| 8,261,531 B2 | 9/2012 | Gandhi et al. | | |
| 8,333,063 B2 | 12/2012 | Elwart et al. | | |
| 8,375,701 B2 | 2/2013 | Lupescu et al. | | |
| 2003/0005916 A1 | 1/2003 | Osanai | | |
| 2009/0150041 A1 | 6/2009 | Hill et al. | | |
| 2010/0011746 A1 | 1/2010 | Lupescu | | |
| 2011/0011264 A1 | 1/2011 | Makino et al. | | |
| 2012/0234269 A1 | 9/2012 | Bellis | | |
| 2014/0373813 A1 * | 12/2014 | Mallebrein | | F02M 25/089 |
| | | | | 123/509 |

OTHER PUBLICATIONS

Pearce, Russell Randall, et al., "Air Intake System Hydrocarbon Trap Purging," U.S. Appl. No. 13/874,225, filed Apr. 30, 2013, 39 pages.

Anonymous, "An AIS Active Purge Method for PHEV Vehicles," IPCOM No. IPCOM000238747D, Published Sep. 16, 2014, 2 pages.

* cited by examiner

AIR INTAKE SYSTEM HYDROCARBON TRAP PURGING

BACKGROUND/SUMMARY

To reduce discharge of fuel vapors into the atmosphere, motor vehicles induct fuel vapors from a fuel tank into the engine. A carbon canister is also coupled to the fuel tank to absorb fuel vapors under some conditions when the internal combustion engine is not running. For example, a carbon canister may adsorb refueling, diurnal and running loss vapors. The carbon canister, however, has limited capacity thus may be periodically purged. To purge the canister, engine running manifold vacuum may be used to desorb the vapor from the activated carbon canister via opening of a canister purge valve (CPV). Desorbed vapors are combusted in the engine.

In some applications, plug-in hybrid electric vehicles (PHEV) may include hydrocarbon (HC) traps in an air induction system of the engine to adsorb fuel vapors in the engine intake, e.g., fuel leaked from fuel injectors and/or fuel collected in the intake, in order to further reduce emissions. To purge fuel vapor stored in an HC trap in the engine intake, a throttle plate in the engine intake may be opened during engine operation to cause air flow which desorbs the HC from the trap. Desorbed vapors are combusted in engine.

In the case of plug-in hybrid vehicles, the internal combustion engine may not operate for a prolonged period of time. Since engine run-time is limited in these applications, purging of an HC trap in the engine intake may also be limited. For example, if HC traps are loaded with hydrocarbons from fuel vapors, the engine may have to be forced on to purge the traps. This results in a fuel economy efficiency penalty.

The inventors herein have recognized the above-described issues and, in one example approach, a method for a vehicle with an engine including an HC trap in an intake of the engine is provided. The method comprises, in response to an ambient temperature decrease during an engine off condition while a fuel tank is sealed from atmosphere, delivering fuel stored in a hydrocarbon trap in an intake of the engine to a fuel vapor canister coupled to the fuel tank in an emission control system.

In this way, vacuum generated in a fuel tank via naturally occurring diurnal temperature changes may be used to passively purge an HC trap in the engine intake while the engine is off, e.g., following a key-off event. The fuel vapors in the HC trap may be delivered to a fuel vapor canister with larger storage capacity for storage therein during engine off conditions. In hybrid vehicle applications, the fuel vapor canister is typically clean as it is designed to adsorb refueling vapors only and refueling events are infrequent. Thus the refueling canister may be used as an HC "storage bank" so that the HC trap may be clean out repeatedly until the engine kicks in to clean out the refueling canister. This results in reduced HC breakthrough in the HC trap leading to reduced emissions while increasing fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
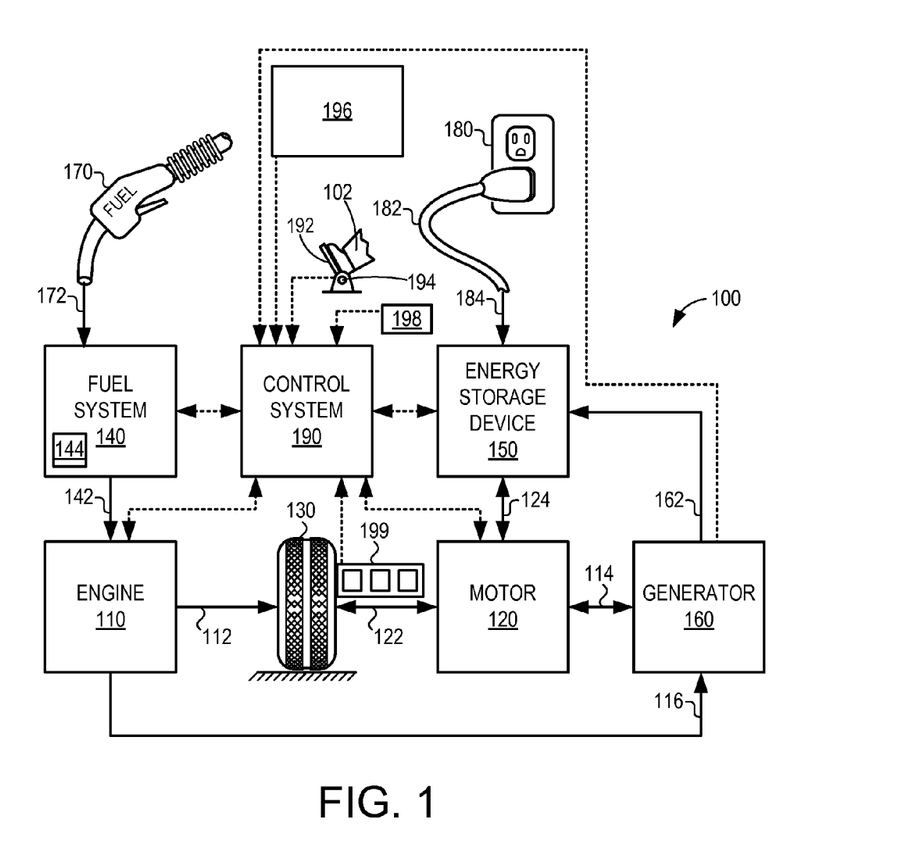
FIG. 1 shows an example vehicle propulsion system.
Figure 3:
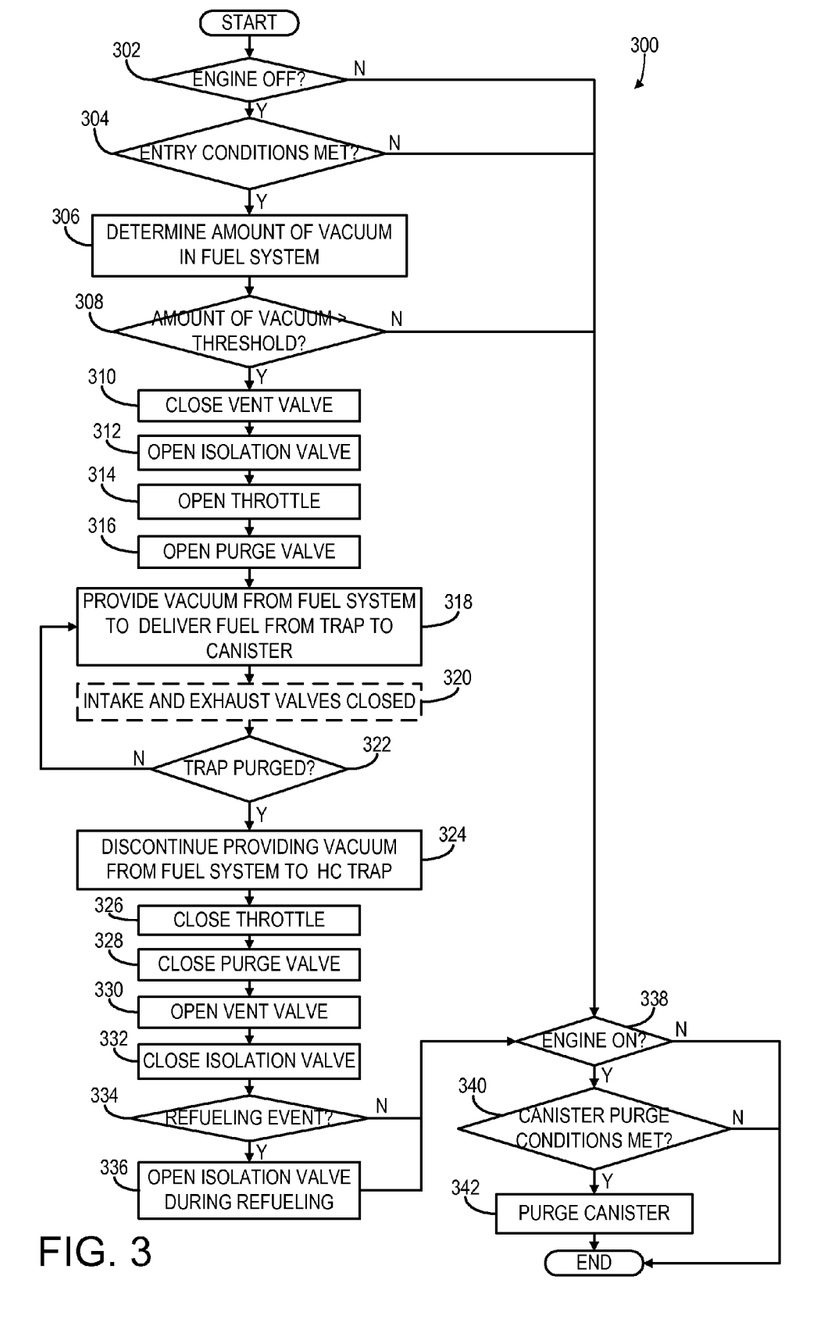
FIG. 3 shows an example method for purging a hydrocarbon trap in an engine intake in accordance with the disclosure.
Figure 4:
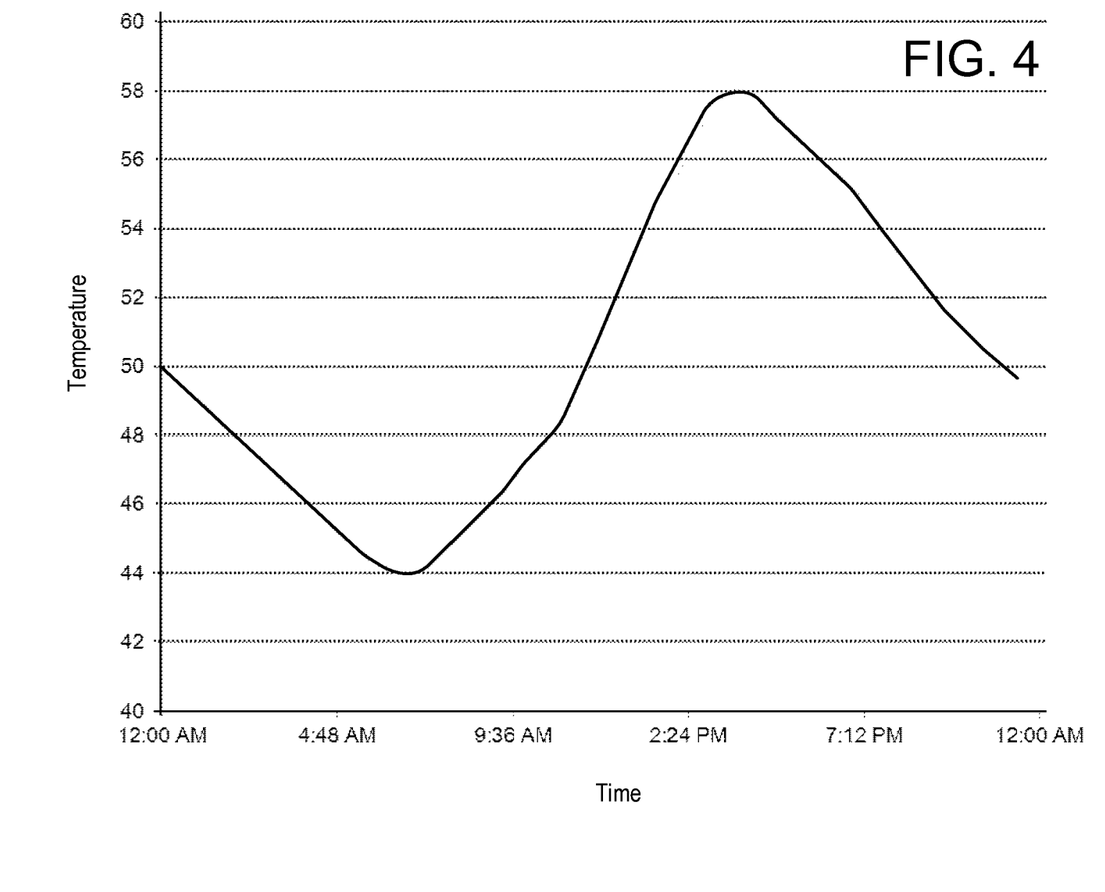
FIG. 4 shows an example diurnal cycle.
Figure 5:
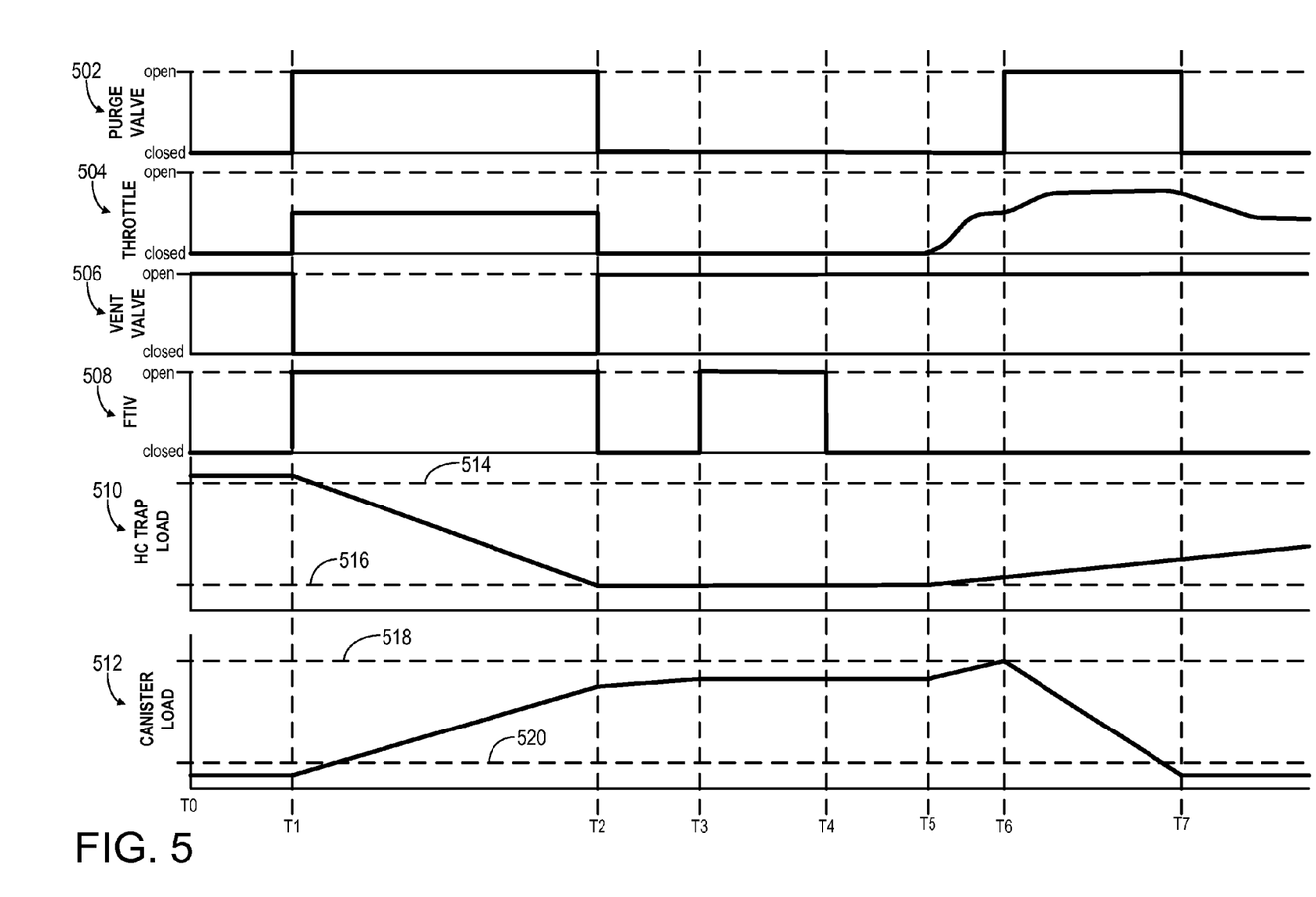
FIG. 5 illustrates an example method for purging a hydrocarbon trap in an engine intake in accordance with the disclosure.

The following description relates to systems and methods for purging a hydrocarbon (HC) trap in an engine intake in a vehicle, e.g., the hybrid vehicle shown in FIG. 1. During engine off conditions in an engine system with an HC trap in the engine intake, e.g., the engine system shown in FIG. 2, vacuum may be generated in a fuel tank via naturally occurring diurnal temperature changes, e.g., as shown in the diurnal cycle in FIG. 4. As shown in FIGS. 3 and 5, during decreasing ambient temperature changes, vacuum generated in the fuel tank may be used purge the HC trap and deliver the purged fuel vapors to a fuel vapor canister for storage therein.

Turning now to the figures, FIG. 1 illustrates an example vehicle propulsion system 100. For example, vehicle system 100 may be a hybrid electric vehicle or a plug-in hybrid electric vehicle. In some examples, vehicle system 100 may be classified according to an emissions ranking, e.g., the vehicle system may be classified as a practically zero emission vehicle (PZEV). Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, and/or engine 110 indicated by arrow 116 where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
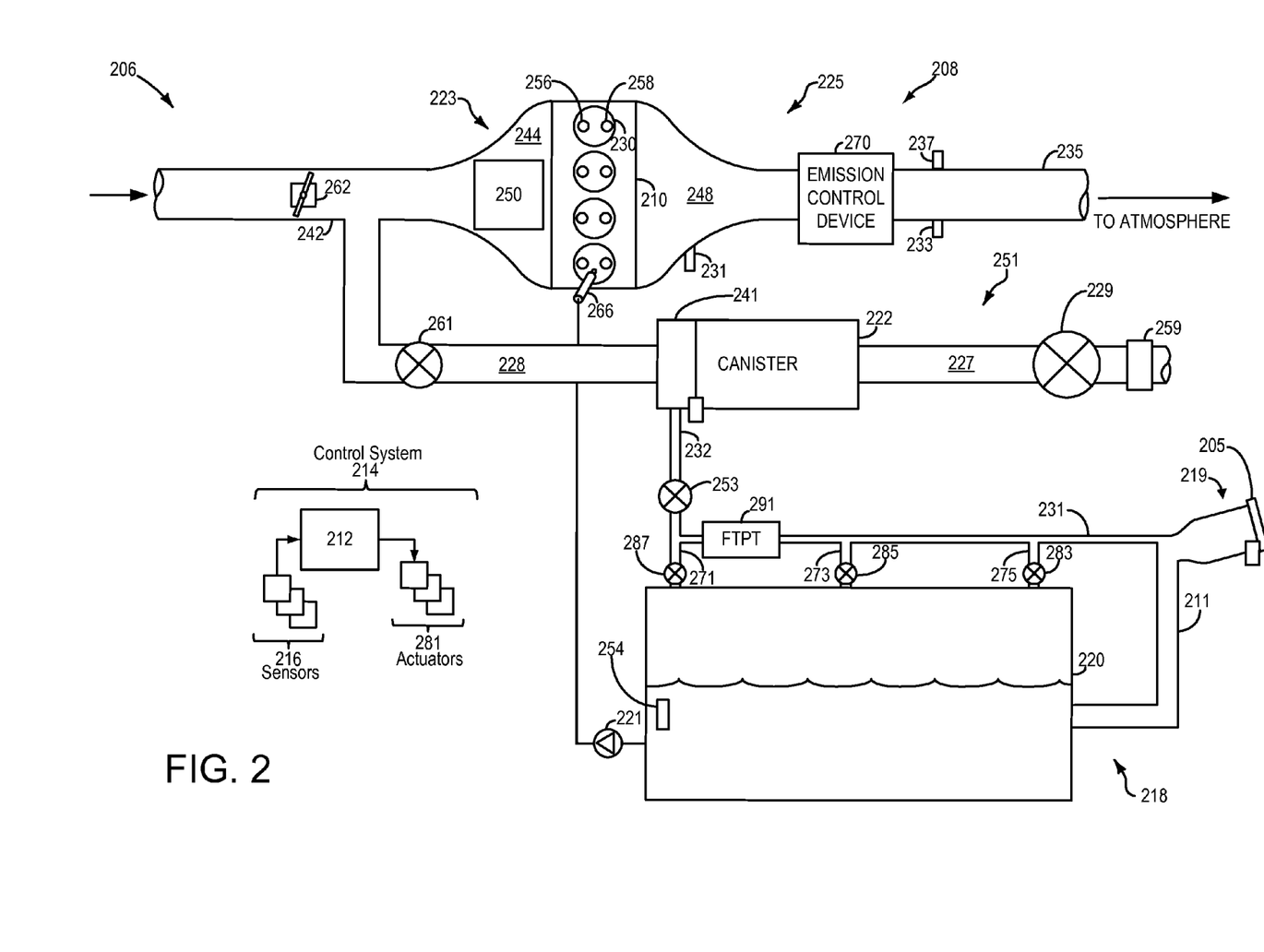
FIG. 2 shows an example vehicle system with a fuel system.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. Each cylinder may include at least one intake valve 256 and at least one exhaust valve 258 coupled to an intake camshaft and exhaust camshaft, respectively. In some examples, the intake and exhaust valves may be electronically controlled hydraulic valves that direct high pressure engine oil into a camshaft phaser cavity in an arrangement known as variable camshaft timing (VCT). These oil control solenoids may be bolted into the cylinder heads towards the front of the engine near camshaft phasers. A powertrain control module (PCM) may transmit a signal to the solenoids to move a valve spool that regulates the flow of oil to the phaser cavity. The phaser cavity changes the valve timing by rotating the camshaft slightly from its initial orientation, which results in the camshaft timing being advanced or retarded. The PCM adjusts the camshaft timing depending on factors such as engine load and engine speed (RPM). This allows for more optimum engine performance, reduced emissions, and increased fuel efficiency compared to engines with fixed camshafts. VCT may be used on either the intake or exhaust camshaft. In some examples, both the intake and exhaust camshafts may have VCT, an arrangement designated as Ti-VCT.

The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

At least one hydrocarbon (HC) trap 250 may be included in intake passage 242. For example, HC trap 250 may be coupled to the engine intake in intake manifold 244 upstream of intake valves 256. HC trap 250 may include a suitable adsorbent, e.g., activated carbon, to adsorb fuel vapors in the engine intake. e.g., fuel leaked from fuel injectors and/or fuel collected or puddled in the intake, in order to further reduce emissions. HC trap 250 may be periodically purged as described in more detail below.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes a fuel vapor canister 222 via vapor recovery line 231, before being purged to the engine intake 223. Fuel vapor canister 222 may include a buffer or load port 241 to which fuel vapor recovery line 231 is coupled. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank isolation valves may be included in recovery line 231 or in conduits 271, 273, or 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include an isolation valve 253. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211. A fuel tank pressure transducer (FTPT) 291, or fuel tank pressure sensor, may be included between the fuel tank 220 and fuel vapor canister 222, to provide an estimate of a fuel tank pressure. As another example, one or more fuel tank pressure sensors may be located within fuel tank 220. Further, in some example, a temperature sensor 254 may also be included in fuel tank 220.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve may be a normally open valve so that fuel tank isolation valve 253 may be used to control venting of fuel tank 220 with the atmosphere. For example, in hybrid vehicle applications, isolation valve 253 may be a normally closed valve so that by opening isolation valve 253, fuel tank 220 may be vented to the atmosphere and by closing isolation valve 253, fuel tank 220 may be sealed from the atmosphere. In some examples, isolation valve 253 may be actuated by a solenoid so that, in response to a current supplied to the solenoid, the valve will open. For example, in hybrid vehicle applications, the fuel tank 220 may be sealed off from the atmosphere in order to contain diurnal vapors inside the tank since the engine run time is not guaranteed. Thus, for example, isolation valve 253 may be a normally closed valve which is opened in response to certain conditions, for example, in response to a fueling event. In some example, in PHEV applications, the fuel vapor canister may only adsorb refueling vapors. In this example, diurnal and running loss vapors may be trapped in the sealed fuel tank by use of a vapor isolation valve FTIV 253.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 231 located upstream of the emission control device, temperature sensor 233, pressure sensor 237, pressure sensor 291, and temperature sensor 254. Other sensors such as pressure, temperature, air/fuel ratio, and composition sensors may be coupled to various locations in the vehicle system 206. As another example, the actuators may include fuel injector 266, throttle 262, fuel tank isolation valve 253, and purge valve 261. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 3.

FIG. 3 shows an example method 300 for purging a hydrocarbon trap in an engine intake by using vacuum generated in a fuel tank during a naturally occurring diurnal temperature decrease. For example, FIG. 4 shows an example diurnal cycle as a graph of temperature versus time. As illustrated in the example diurnal cycle in FIG. 4, ambient temperatures naturally increase during the day and decrease at night leading to corresponding temperature fluctuations in the fuel system. For example, as shown in FIG. 4 between approximately 7:00 PM to 5:00 AM ambient temperatures are decreasing leading to a decrease in temperatures in the fuel system and a corresponding increase in vacuum present in the fuel system when sealed from the atmosphere. However, between approximately 5:00 AM and 7:00 PM ambient temperatures are increasing leading to an increase in temperatures in the fuel system and a corresponding increase in pressure present in the fuel system when sealed from the atmosphere. As described below, vacuum generated in the fuel tank due to these naturally occurring temperature changes may be used during engine off conditions to purge fuel vapor stored in an HC trap in an intake of the engine.

At 302 in FIG. 3, method 300 includes determining if engine off conditions are present. For example, engine off conditions may be present following a vehicle key-off event when the vehicle is turned off or when the vehicle is operated using an auxiliary power source while the engine is not in operation. During engine off conditions a controller may periodically "wake-up" to determine if entry conditions for purging the HC trap are present. For example, an amount of fuel vapor stored in the HC trap may be determined just prior to or during a key-off event to determine if the HC trap is to be purged following the key-off event while the engine is not in operation.

If engine off conditions are not present at 302, method 300 proceeds to 338 described below. However, if engine off conditions are present at 302, method 300 proceeds to 304. At 304, method 300 includes determining if entry conditions are met. Entry conditions may include an ambient temperature decrease during an engine off condition while a fuel tank is sealed from atmosphere. For example, the fuel tank may be sealed from atmosphere via an isolation valve between the fuel tank and the canister. As another example, entry conditions may include an amount of fuel vapor stored in the HC trap greater than a threshold. An amount of fuel vapor stored in the HC trap may be based on one or more fuel sensors in the HC trap and/or in an intake of the engine. As another example, the amount of fuel vapor stored in the HC trap may be based on a cumulative engine run-time. For example, if the engine has been operated for an amount of time greater than a threshold time, then it may be inferred that the amount of vapor stored in the HC trap is greater than a threshold. Thus, scheduling of HC trap purging may be based on engine run time instead of or in addition to various sensors disposed in the HC trap or engine intake.

Entry conditions may further include an amount of fuel vapor stored in the fuel vapor canister less than a threshold. An amount of fuel vapor stored in the fuel vapor canister may be based on one or more sensors in the emission control system 251. For example, various monitoring routines may be performed on the fuel vapor canister to determine an amount of fuel vapor stored therein. As another example, the amount of fuel vapor stored in the fuel vapor canister may be determined from a model based on engine and vehicle operating conditions or based on refueling events. For example, in HEV applications, fuel tank 220 may only be vented to the fuel vapor canister during refueling events. Thus, the amount of fuel vapor stored in the canister may be based on the number of and length of refueling events which have occurred following a previous canister purging event. In particular, at appropriate time after key off, a controller may "wake up" and determine how much "loading" is in refueling canister. If the refueling canister is not overly loaded with hydrocarbons from a recent refuel, then fuel vapor stored in the HC trap may be delivered to the canister for storage therein as described below. Vapors adsorbed into the refueling canister will get trapped until they get purged into the combustion engine at the next opportunity.

If entry conditions are not met at 304, method 300 proceeds to 338 described below. However, if entry conditions are met at 304, method 300 proceeds to 306. At 306, method 300 includes determining an amount of vacuum in the fuel system. For example, a pressure sensor in the fuel system may be used to determine an amount of vacuum in the fuel tank. In some examples, determining an amount of vacuum in the fuel tank during an engine off condition may be performed at a selected time following an engine off event based on a time of day. For example, if a vehicle is keyed off during the morning hours, the controller may not be scheduled to wake up hours later since temperature will likely rise. However, if the vehicle is keyed off during the evening then the controller may be scheduled to wake-up at a predetermined time following the key-off since ambient temperatures are likely to be decreasing during the evening leading to vacuum generation in the fuel system. Thus, at appropriate time after key off, the controller may wake up and determine how much vacuum is in the tank.

At 308, method 300 includes determining if an amount of vacuum in the fuel tank is larger than a threshold. If the amount of vacuum is less than the threshold, then method 300 proceeds to 338 described below. However, if the amount of vacuum is larger than the threshold at 308, then method 300 proceeds to 310. At 310, method 300 includes closing a canister vent valve in a vent path of the canister. For example vent valve 229 may be closed to seal off the canister and fuel tank from the atmosphere. At 312, method 300 includes opening a fuel tank isolation valve. For example, FTIV valve 253 may be opened so that fuel tank 220 is put in communication with canister 222 and purge line 228. At 314, method 300 includes opening a throttle in an intake of the engine. For example, intake throttle 262 may be adjusted to a partially open fixed position. At 316, method 300 includes opening a purge valve. For example, purge valve 261 may be opened so that vacuum in the fuel tank may be provided to the engine intake to draw fuel vapor stored in HC trap 250 into the canister 222. In some examples, an opening amount of the purge valve may be pulsed to cause air flow to desorb the hydrocarbons from the HC trap.

At 318, method 300 includes providing vacuum from the fuel system to deliver fuel from the HC trap to the fuel vapor canister. For example, the vacuum in the fuel tank provided to the engine intake may deliver fuel stored in the HC trap in the intake of the engine to the fuel vapor canister coupled to the fuel tank in the emission control system. The hydrocarbon vapors will flow into the refueling canister to be purged later or into the fuel tank where they will condensate.

At 320, method 300 may include closing or maintaining intake and exhaust valves in cylinders of the engine in a closed position For example, in a Ti-VCT engine, intake and exhaust valves in cylinders of the engine may be positioned in a closed state while providing vacuum from the fuel tank to the HC trap to deliver fuel stored in the trap to the fuel vapor canister.

At 322, method 300 includes determining if the HC trap is sufficiently purged. Determining if the HC trap is sufficiently purged may be based on an amount of fuel vapor delivered from the hydrocarbon trap to the fuel vapor canister greater than a threshold. As another example, determining if the HC trap is sufficiently purged may be based on a time duration of HC trap purging. For example, if the HC trap is purged for a time duration greater than a threshold time duration then it may be inferred that the HC trap is sufficiently purged.

If the HC trap is not purged at 322, method 300 continues providing vacuum from the fuel system to deliver fuel from the HC trap to the fuel vapor canister. However, if the HC trap is sufficiently purged at 322, then method 300 proceeds to 324. At 324, method 300 includes discontinuing providing vacuum from the fuel system to the HC trap. Thus, at 326, method 300 includes closing the throttle in the intake of the engine. At 328, method 300 includes closing the purge valve. At 330, method 300 includes opening the canister vent valve. At 332, method 300 includes closing the fuel tank isolation valve.

At 334, method 300 includes determining if a refueling event occurs. Determining if a refueling event occurs may be based on a vehicle operator input, e.g., a vehicle operator may provide input at a vehicle instrument panel indicating a desire to replenish fuel in the fuel tank. As another example, a refueling event may be initiated when a fuel cap is removed for refueling. If a refueling event does not occur at 334, method 300 proceeds to 338 described below. However, if a refueling event occurs at 334, then method 300 proceeds to 336. At 336, method 300 includes opening the fuel tank isolation valve during refueling to vent the fuel tank while fuel is replenished in the fuel tank.

As remarked above, since the fuel vapor canister has a larger storage capacity than the HC trap, the canister may be used to store vapors purged from the HC trap. The fuel vapor canister may then be purged at a later time while the engine is running. Thus, at 338, method 300 includes determining if the engine is in operation. If engine on conditions are present at 338, method 300 proceeds to 340. At 340, method 300 includes determining if fuel vapor canister purging conditions are met. Canister purge conditions may be based on an amount of fuel vapor stored in the canister. For example, purge conditions may include an amount of fuel vapor stored in the canister greater than a threshold.

If purge conditions are met at 340, method 300 proceeds to 342 to purge the fuel vapor canister. For example, purge valve 261 may be opened and vacuum in the intake of the engine may be used to draw fuel vapors from the canister to the engine intake so that the fuel vapors are combusted in the engine.

FIG. 5 illustrates an example method, e.g., method 300 described above, for purging a hydrocarbon trap in an engine intake by using vacuum generated in a fuel tank during a naturally occurring diurnal temperature decrease. The graph 502 in FIG. 5 shows actuation of purge valve 261 between a closed and open position versus time. The graph 504 shows actuation of throttle 262 between a closed and partially open position versus time. The graph 506 shows actuation of canister vent valve 229 between a closed and open position versus time. The graph 508 shows actuation of fuel tank isolation valve (FTIV) 253 between a closed and open position versus time. The graph 510 shows HC trap loading, e.g., the amount of fuel vapor stored in HC trap 250, versus time. The graph 512 shows fuel vapor canister loading, e.g., the amount of fuel vapor stored in canister 222, versus time.

At time T0 in FIG. 5 an engine off event occurs. For example, a vehicle operator may perform a key-off to discontinue vehicle operation or the vehicle may transition from an engine on mode to an engine off mode. For example, time T0 may occur during an evening time when an ambient temperature is decreasing, e.g., as shown in the diurnal cycle of FIG. 4. At time T1 following the engine off event, an HC purge event is initiated since the HC trap load is greater than a threshold 514 and the canister load is less than threshold 520. Thus, at time T1, the purge valve is adjusted from a closed position to an open position, the throttle is adjusted from a closed position to a partially open fixed position, the vent valve is adjusted from a closed position to an open position, and the FTIV is adjusted from a closed position to an open position so that vacuum in the fuel tank is provided to the engine intake to draw fuel vapors from the HC trap to the canister. During the HC trap purge process between times T1 and T2, the fuel vapors stored in the HC trap are transferred to the canister so that the loading in the HC trap decreases to threshold 516 while the loading in the canister increases. At time T2, the HC trap is sufficiently purged as indicated by the HC trap loading decreasing to threshold 516. Thus, at time T2, the HC trap purging is terminated by closing the purge valve, closing the throttle, closing the FTIV, and opening the vent valve.

At time T3, while engine off conditions are still present, a refueling event is initiated. Thus, at time T3, the FTIV is opened to vent the tank to the atmosphere while fuel in the fuel tank is replenished. At time T4, the refueling event is completed and the FTIV is closed. At time T5, the engine is started so that engine operation resumes. For example, at time T5, a key-on event may occur or the vehicle may transition from an engine off mode to an engine on mode. Thus, after time T5, the throttle is adjusted based on engine operating conditions, e.g., engine speed or load. At time T6, while the engine is in operation, a canister purge event is initiated since the canister load has reached the threshold 518. Thus, at time T6, the purge valve is opened and fuel vapors are drawn from the canister to the engine intake via vacuum in the engine intake. When the loading of the canister decreases to threshold 520 at time T7, the purge event is terminated and the purge valve is closed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with an engine, comprising: in response to an ambient temperature decrease during an engine off condition while a fuel tank is sealed from atmosphere and from a fuel vapor canister via an isolation valve between the fuel tank and the fuel vapor canister, delivering fuel stored in an adsorbent in a hydrocarbon trap in an intake of the engine to the fuel vapor canister coupled to the fuel tank in an emission control system by opening the isolation valve and providing vacuum in the fuel tank to the hydrocarbon trap via the fuel vapor canister, wherein delivering fuel stored in the hydrocarbon trap to the fuel vapor canister comprises closing a canister vent valve in a vent path of the fuel vapor canister, opening a throttle in the intake of the engine, and pulsing a purge valve open and closed in order to cause airflow through the throttle to desorb hydrocarbons bound to the adsorbent.

2. The method of claim 1, further comprising closing the purge valve, closing the throttle, opening the vent valve, and closing the isolation valve in response to an amount of fuel vapor delivered from the hydrocarbon trap to the fuel vapor canister greater than a threshold.

3. The method of claim 1, further comprising in response to an amount of vacuum in the fuel tank reaching a vacuum threshold while sealed from atmosphere during the engine off condition, providing vacuum from the fuel tank to the hydrocarbon trap to deliver fuel stored in the hydrocarbon trap to the fuel vapor canister.

4. The method of claim 1, wherein delivering fuel stored in the hydrocarbon trap to the fuel vapor canister is performed in response to an amount of fuel vapor stored in the fuel vapor canister less than a threshold.

5. The method of claim 1, wherein intake and exhaust valves in cylinders of the engine are positioned in a closed state while delivering fuel stored in the hydrocarbon trap to the fuel vapor canister.

6. The method of claim 1, wherein the hydrocarbon trap is coupled in an intake manifold of the engine, and wherein the adsorbent includes activated carbon.

7. The method of claim 1, further comprising in response to a fuel vapor purging event while the engine is in operation, purging fuel vapors stored in the fuel vapor canister to the intake of the engine.

8. The method of claim 1, wherein the engine off condition follows a vehicle key-off event.

9. The method of claim 1, wherein the vehicle is a plug-in hybrid electric vehicle.

10. A method for a vehicle with an engine, comprising:
in response to an ambient temperature decrease during an engine off condition while a fuel tank is sealed from atmosphere and from a fuel vapor canister via an isolation valve between the fuel tank and the fuel vapor canister, delivering fuel stored in an adsorbent in a hydrocarbon trap in an intake of the engine to the fuel vapor canister coupled to the fuel tank in an emission control system by opening the isolation valve and providing vacuum in the fuel tank to the hydrocarbon trap via the fuel vapor canister, further comprising:
determining a time of day of a most recent engine-off event;
waking a vehicle controller at a pre-determined time following the engine-off event, the pre-determined time based on the time of day of the most recent engine-off event; and
determining an amount of vacuum in the fuel tank following waking the vehicle controller, and in response to the amount of vacuum determined at a selected time being greater than a threshold, providing vacuum from the fuel tank to the hydrocarbon trap to deliver fuel stored in the hydrocarbon trap to the fuel vapor canister.

11. A method for a hybrid vehicle with an engine, comprising:
in response to an amount of vacuum in a sealed fuel system of the vehicle reaching a vacuum threshold during an engine off condition, selectively providing vacuum from the fuel system without activating a vacuum pump to a hydrocarbon trap in an intake of the engine to deliver fuel stored in activated carbon in the hydrocarbon trap to an activated carbon fuel vapor canister in an emission control system, wherein the fuel system is sealed from atmosphere via an isolation valve between the fuel system and the fuel vapor canister and delivering fuel stored in the hydrocarbon trap to the fuel vapor canister comprises closing a canister vent valve in a vent path of the fuel vapor canister, opening the isolation valve, opening a throttle in the intake of the engine and opening a purge valve in a purge line between the fuel vapor canister and the intake of the engine to provide vacuum to the hydrocarbon trap.

12. The method of claim 11, further comprising closing the purge valve, closing the throttle, opening the vent valve, closing the isolation valve, and maintaining the engine off in response to an amount of fuel vapor delivered from the hydrocarbon trap to the fuel vapor canister greater than a threshold.

13. The method of claim 11, further comprising determining the amount of vacuum in the fuel system during the engine off condition at a selected time based on a time of day, and in response to the amount of vacuum determined at the selected time being greater than a threshold, providing vacuum from the fuel system to the hydrocarbon trap to deliver fuel stored in the hydrocarbon trap to the fuel vapor canister.

14. The method of claim 11, wherein the vehicle is a plug-in hybrid electric vehicle and the hydrocarbon trap is coupled in an intake manifold of the engine upstream of a cylinder intake valve of the engine.

15. A hybrid vehicle system, comprising:
a hydrocarbon trap including an adsorbent and situated in an intake of an engine;
a fuel vapor canister coupled to the intake of the engine via a purge line, the fuel vapor canister comprising the adsorbent;
a canister vent valve in a vent path of the fuel vapor canister;
a fuel tank coupled to the fuel vapor canister;
a fuel tank isolation valve between the fuel tank and the fuel vapor canister;
a purge valve in the purge line;
a throttle in the intake of the engine; and
a controller configured to:
at an engine-off event, determine a load of the hydrocarbon trap based on an engine run-time since a most recent engine-on event;
responsive to the hydrocarbon trap load being greater than a threshold, close the fuel tank isolation valve to seal off the fuel tank from atmosphere;
determine an amount of vacuum in the sealed fuel tank during an engine off condition; and
in response to the amount of vacuum in the sealed fuel tank during the engine off condition greater than a threshold:
close the canister vent valve;
open the isolation valve;
open the throttle; and
open the purge valve to provide vacuum to the hydrocarbon trap to deliver fuel stored in the hydrocarbon trap to the fuel vapor canister.

16. The system of claim 15, wherein the controller is further configured to close the purge valve, close the throttle, open the vent valve, and close the isolation valve following delivery of fuel vapor from the hydrocarbon trap to the fuel vapor canister.

17. The system of claim 15, wherein determining the amount of vacuum in the sealed fuel tank during the engine off condition is performed at a selected time based on a time of day.

18. The system of claim 15, wherein the hybrid vehicle system is a plug-in hybrid electric vehicle system, and wherein the adsorbent is activated carbon.

* * * * *